United States Patent [19]

Hori et al.

[11] Patent Number: 4,614,781

[45] Date of Patent: Sep. 30, 1986

[54] RESIN FROM SAPONIFIED ETHYLENE-VINYL ACETATE COPOLYMERS, PRODUCTION AND USE THEREOF

[75] Inventors: Teruo Hori, Toyonaka; Masamitsu Nakabayashi, Sennan; Yuzo Furukawa, Kawanishi, all of Japan

[73] Assignee: Takeda Chemical Industries, Ltd., Osaka, Japan

[21] Appl. No.: 668,822

[22] Filed: Nov. 6, 1984

[30] Foreign Application Priority Data

| Nov. 7, 1983 | [JP] | Japan | 58-209611 |
| Dec. 26, 1983 | [JP] | Japan | 58-248643 |
| Feb. 16, 1984 | [JP] | Japan | 59-28107 |
| Oct. 16, 1984 | [JP] | Japan | 59-217784 |

[51] Int. Cl.$^4$ .................................................. C08F 8/12
[52] U.S. Cl. ....................................................... 525/330.6
[58] Field of Search ...................................... 525/330.6

[56] References Cited

U.S. PATENT DOCUMENTS

| 3,547,858 | 12/1970 | Worrall | 525/330.6 |
| 3,780,004 | 12/1973 | Hoyt et al. | 525/330.6 |
| 3,972,865 | 8/1976 | McClain et al. | 525/330.6 |

FOREIGN PATENT DOCUMENTS 55-21447 2/1980 Japan .
55-23870 2/1983 Japan .

OTHER PUBLICATIONS

Rosenblum, Carboxylation Increases Versatility of Polyvinyl Acetate-Based Adhesives; Adhesives Age, Apr. 1979.

*Primary Examiner*—Paul R. Michl
*Assistant Examiner*—Alex H. Walker
*Attorney, Agent, or Firm*—Wenderoth, Lind & Ponack

[57] ABSTRACT

Disclosed are a colorless and transparent carboxyl-modified resin of saponified ethylene-vinyl acetate copolymers prepared from an ethylene-vinyl acetate copolymer, the 1.0 mm-thick sheet therefrom having a total transmittance of more than 90%, a haze of less than 3% and a yellowness index of 3 and the preparation of the resin. The uses of the resin are also disclosed for laminated glass wherein the resin is used as an interlayer as well as for a solar cell module wherein the resin is used as a sealing material of a semiconductor element.

26 Claims, No Drawings

RESIN FROM SAPONIFIED ETHYLENE-VINYL ACETATE COPOLYMERS, PRODUCTION AND USE THEREOF

The present invention relates to a colorless and transparent carboxyl-modified resin from saponified ethylene-vinyl acetate copolymers, a process for producing the same, laminated glass having the same as an interlayer and a solar cell module wherein a semiconductor element is sealed with the same.

The so-called carboxyl-modified resin obtainable by modifying a saponified ethylene-vinyl acetate copolymer formed by saponifying an ethylene-vinyl acetate copolymer (hereinafter referred to briefly as "EVA") with an acid has been used as adhesives, films, powder coatings, and so forth, and the production methods have also been widely known. Though the carboxyl-modified resin obtained by the conventional production processes shows good adhesion to aluminium, etc., there still remain problems left unsolved in terms of coloration, clarity, etc., and the carboxyl-modified resin has not been industrially realized in the fields of laminated glass and a solar cell module.

Generally, it has been widely known to employ films of cellulose nitrate, cellulose acetate, plasticized acrylate resin and plasticized polyvinyl butyral as the intermediate film for bonding laminated glass. Among others, the plasticized polyvinyl butyral film exhibits improved bonding strength, and is superior to other types of the films in terms of light stability and flexibility at low temperatures, and has nowadays been extensively used for the production of safety glass for automobiles, airplanes, etc. This polyvinyl butyral film, which is a partially acetalized product of a polyvinyl alcohol derived from a polyvinyl acetate resin, is a synthetic resin film made up of 80 to 85 weight % of the polyvinyl butyral component, 3 to 7 weight % of the polyvinyl acetate component and the remainder of the polyvinyl alcohol component. The resin film, when employed alone, has the defects that its rigidity is too great and its flexibility is insufficient as the interlayer for laminated glass. For the purpose of making up for the defects, about 40 weight % of a high boiling plasticizer with a low vapor pressure is added thereto. However, such a plasticized polyvinyl butyral film is highly tacky at ambient temperature, inviting many difficulties in handling prior to operations of fabricating laminated glass and in transportation. In order to eliminate the tackiness of the said resin film, an uneven pattern is provided on the surface of the film and powdered sodium hydrogencarbonate is scattered thereon. So, the water-washing and drying steps are required in advance of the bonding step to remove the tackiness suppressing powder, and in addition, the plasticized polyvinyl butyral film, because of its great hygroscopicity, tends to absorb moisture, resulting in deterioration in adhesiveness, and must therefore be dried until the content of moisture becomes not more than 0.5 weight %. Also, the plasticized butyral film, whose tackiness augments with rising temperature and whose sliding property toward glass gets worse, has a tendency to impair the processability or workability. In order to improve the tendency and to suppress the hygroscopicity, the temperature of working places must be maintained at about 20° C. In practical bonding the plasticized butyral film as the intermediate layer between two sheets of glass to be laminated, it is essential to adopt the two-step bonding method which normally involves preliminary bonding according to a roll process or reduced-pressure process and final bonding in a hydraulic type or air-pressure type autoclave at a pressure of 10 to 15 kg/cm2 and at a temperature of 130° to 140° C. In this bonding method, there comes out the defect that the required production facilities become necessarily large-scale ones. As a measure of eliminating the defect, there have been proposed acid-modified saponified products from EVA (e.g., Japanese Examined Patent Publication No. 16826/'72). The acid-modified products are free of the difficulties in handling or working as is the case with the plasticized butyral film, and in the step of bonding as well, are sufficiently adherable by means of a simple method which comprises heating at a temperature in the neighborhood of 100° C. under the reduced-pressure, not requiring large-scale facilities as are employed in the manufacture of the laminated glass having the plasticized butyral film as the interlayer. With reference to the performance of the resulting laminated glass, the laminated glass having the acid-modified product as the interlayer exhibits impact resistance and heat resistance comparable to those of the laminated glass having the plasticized butyral film as the interlayer. When the acid-modified product is used as the interlayer to manufacture laminated glass, it suffers from the disadvantage that transparency of the resulting laminated glass varies considerably depending upon the way of cooling after heat-bonding; for example, rapid cooling maintains transparency equal to the one realized in polyvinyl butyral, while gradual cooling results in remarkably deteriorated transparency. Yet, it is virtually impossible to adopt the rapid cooling method in the practical manufacturing process for laminated glass, because it leads to fracturing of glass. Therefore, deterioration of transparency due to gradual cooling has been the fatal defect of the laminated glass having the said acid-modified product as the intermediate film.

Furthermore, another defect of the intermediate film of this acid-modified product lies in that in the production steps for said acid-modified resin or during the processes where such reactions as saponification of EVA and acid-modification of the saponified product are carried out continuously in succession, the resin produced undergoes considerable discoloration, eventually resulting in coloration of the laminated galss having the said resin as the intermediate film.

Recently, the generation of electricity by use of solar cells is particularly attracting great attention because of its cleanness and permanent duration. The solar cell is a packaged device fabricated by connecting in series or in parallel wafers of silicone semiconductor or selenium semiconductor capable of generating electric currents when irradiated with light, with the help of interconnectors, and protecting the assembly with a transparent protective material for the top, such as glass, polyacrylate and polycarbonate, and with a protective material for the bottom substrate, such as glass, stainless steel, aluminum and plastics, the semiconductor element and each of the protective materials being bonded together usually with use of a sealing material.

It is required of the sealing material to possess the elastomer-like properties in order to prevent the semiconductor element from being damaged and keep the sealing material free from cracking and interfacial peeling phenomena under the rapid change of the atmospheric conditions. It is desirable, in addition, that such a sealing material, when it is used on the side of the solar cell into which sunlight enters, retains high sunlight transmittance and also does not undergo deterioration in physical properties, such as lowering of light transmittance, upon outdoor exposure for long. For the purpose of this, conventionally, there have been used fluid silicone resines of heat-crosslinking type, but they have the disadvantages, for example, that they are costly and that they require many steps for coating and bonding, thus making them unsuited for automation.

Therefore, a polyvinyl butyral resin sheet, which has been put into practical use in the production of laminated glass, has recently begun to be utilized, but cannot always be said to be satisfactory as a filling material for the solar cell. Namely, the surface of the polyvinyl butyral sheet is dusted with powdered sodium hydrogencarbonate for the purpose of antiblocking, and it, in advance of use, has to be washed to remove the powdered sodium hydrogencarbonate and dried; and furthermore, in the bonding step it is necessary to use an autoclave because the sheet possesses poor flowing property. The polyvinyl butyral resin requires many production steps and is not suited for automation. With reference to the quality, it shows inferior humidity characteristics and, when allowed to stand under high humidities for a long period of time, it causes a devitrification phenomenon, resulting not only in lowering of light transmittance but also markedly decreasing of bonding strength, and it eventually gives rise to peeling phenomena at the interfaces with the transparent protective material for the top and with protective material for the bottom substrate and with the solar cell element. Also, the sheet does not necessarily exhibit good low-temperature characteristics.

In place of the polyvinyl butyral sheet with such problems, an ethylene-vinyl acetate copolymer sheet is nowadays begun to be investigated from the standpoint of cost reduction of the solar cell module. However, the customarily used ethylene-vinyl acetate copolymer fails to satisfy the characteristics required as a sealing material in the solar cell. That is to say, according as the vinyl acetate content in the copolymer increases, for example, its transparency and flexibility improve, but the forming and blocking properties of the sheet becomes worse, and it is difficult to render the copolymer satisfactory in terms of both characteristics simultaneously, with the heat resistance and weatherability being insufficient. Moreover, the copolymer is inadequate in terms of permanent adhesion with the transparent protective material for the top and protective material for the bottom substrate which is a crucial factor for the reliability of the solar cell module.

As the art freed from the defects, there has been proposed an ethylene-vinyl acetate copolymer containing an organic peroxide as a sealing material sheet. In bonding the sheet to the transparent protective material for the top and protective material for the bottom substrate, the surfaces of the protective materials to be bonded and/or the surface of the sealing material sheet are in advance treated with a primer and heating to more than the decomposition temperature of the organic peroxide is effected during the bonding to manufacture the solar cell (e.g., Japanese Unexamined Patent Publication No. 23870/1983).

However, it constitutes extremely complicated operations to treat the protective materials and sealing material sheet with a primer. In addition, the step in which heating treatment at temperatures as high as 120° to 160° C. is carried out to allow crosslinking with a peroxide produces the defects that it exerts adverse effects on the protective materials, such as deterioration by heat, and that it brings about shrinkage through crosslinking of the sealing material sheet, eventually resulting in poor dimensional stability of the solar cell. Furthermore, such a step involves the disadvantage that an extremely slight amount of the organic peroxide remaining after the heat treatment aggravates the weatherability (coloration).

The present inventors conducted intensive investigations into a carboxyl-modified resin from saponified ethylene-vinyl acetate copolymers which is particularly useful as an interlayer for laminated glass and as an sealing material for a semiconductor element in a solar cell module.

Thus, the present invention is directed to (1) a carboxyl-modified resin of a saponified ethylene-vinyl acetate copolymer, the 1.0 mm-thick sheet therefrom having a total transmittance of more than 90%, a haze of less than 3% and a yellowness index of less than 3, (2) a process for producing a carboxyl-modified resin of a saponified ethylene-vinyl acetate copolymer, the 1.0 mm-thick sheet from the carboxyl-modified resin having a total transmittance of more than 90%, a haze of less than 3% and a yellowness index of less than 3, which comprises dissolving an ethylene-vinyl acetate copolymer with a vinyl acetate content of about 20 to 50 weight % in an organic solvent having a boiling point of not less than 50° C., saponifying the copolymer with an alkali alcoholate in the solution in the presence of water of 0.1 to 3 moles per mole of the alcoholate, and allowing the saponified product in the solution to react with an unsaturated carboxylic acid or acid anhydride and contacting the said reaction solution with water, (3) laminated glass having, as an interlayer, a carboxyl-modified resin of a saponified ethylene-vinyl acetate copolymer, the 1.0 mm-thick sheet therefrom having a total transmittance of more than 90%, a haze of less than 3% and a yellowness index of less than 3, and (4) a solar cell module wherein a semiconductor element is sealed with a carboxyl-modified resin of a saponified ethylene-vinyl acetate copolymer, the 1.0 mm-thick sheet therefrom having a total transmittance of more than 90%, a haze of less than 3% and a yellowness index of less than 3.

The procedures for the production of the carboxyl-modified resin (hereinafter sometimes referred to briefly as "C-HEVA") will be described below.

As the starting EVA, there may be mentioned those with a vinyl acetate content of about 20 to 50 weight % and a melt index (as specified by ASTM D-1238) of 0.5 to 500 g/10 min.. Said EVAs can be produced by the methods such as that described in the specification of U.S. Pat. No. 2,200,429.

In the process of the present invention, the EVA is in the first place dissolved in an organic solvent having a boiling point of not less than 50° C. Examples of the organic solvent include an aromatic hydrocarbon, such as benzene, toluene, o-xylene, m-xylene, ethylbenzene and propylbenzene, or an aliphatic and alicyclic hydrocarbon, such as n-hexane and cyclohexane. As preferred examples of these organic solvents, there may be mentioned aromatic hydrocarbons being azeotropic with water, such as xylene and toluene, and solvents having a boiling point of 100° to 200° C. It suffices to use these solvents in such quantities as may be required for dissolving the EVA, but it is preferable to employ normally 150 to 500 parts by weight of the solvent against 100 parts by weight of the EVA in order to allow the subsequent reaction to proceed smoothly.

Then, the EVA solution thus prepared, after being admixed with a lower alcohol($C_{1-5}$), is subjected to a saponification reaction with use of an alkali alcoholate catalyst in the presence of a specifically fixed amount of water.

As the lower alcohol, there may be mentioned, for example, methyl alcohol, ethyl alcohol, propyl alcohol, isopropyl alcohol, butyl alcohol, isobutyl alcohol, sec-butyl alcohol and tert-butyl alcohol, and normally, methanol is used. These lower alcohols are normally used in the proportion of about 0.1 to 10 moles, preferably 1 to 8 moles, per mole of vinyl acetate in the starting EVA, depending upon the intended degree of saponification. As the alkali alcoholate acting as a catalyst, there may be used alcoholates of alkali metals (e.g. sodium, potassium, lithium), such as sodium methoxide, sodium ethoxide, potassium methoxide, potassium ethoxide, lithium methoxide and potassium t-butoxide. The amount of the alkali alcoholate catalyst to be used is normally at the rate of about 0.01 to 1 mole, preferably 0.01 to 0.2 mole, per mole of vinyl acetate existing in the starting EVA, depending upon the intended degree of saponification.

The process of the present invention is characterized by the coexistence of 0.1 to 3 moles of water per mole of alkali alcoholate in the step of the saponification reaction. Water of less than 0.1 mole hardly produces the effect of preventing the saponified product from coloring and water of more than 3 moles requires an excess of the alkali catalyst and alcohol; to obtain the saponified product with the intended degree of saponification. This is not only economically unfavorable, but also the saponified product as produced under these conditions yields carboxyl-modified products which, when processed into final products such as intermediate films for laminated glass, encounter problems in terms of product quality, such as enhanced opacity.

The saponification reaction is carried out under the conventionally employed conditions, for example, at 40° C. to 60° C. At the time when a fixed time, for example, 0.5 to 3 hours, has passed, the reaction is terminated completely by adding water to the reaction system. In order to obtain the saponified product with the intended degree of saponification, the amounts of the lower alcohol, water and catalyst can be adjusted. The saponification in the presence of water normally requires a larger excess of alcohol as compared with the saponification reaction in the absence of water. The degree of saponification in this step is not particularly limited, but saponified products having normally the saponification degree of about 10 to 80%, preferably 30 to 70%, are formed.

The reaction solution in the saponification reaction is successively subjected to an acid modification reaction with an unsaturted carboxylic acid or acid anhydride but it is preferable to heat, prior to this reaction, the saponification reaction solution to remove, through distillation, the water used for the saponification reaction and the termination of the reaction and the low-boiling by-products formed by the saponification reaction. Particularly when an acid anhydride is used, water existing in the reaction system affects adversely the reaction, and it is necessary to remove substantially water in advance.

The reaction with an unsaturated carboxylic acid is carried out by heating in the presence of a radical-forming substances. The term "unsaturated carboxylic acid" denotes compounds represented by the general formula $CHR'{=}CRCOOH$ where R and R' each is hydrogen, alkyl (e.g. methyl), carboxyl or carboxylic acid ester (e.g. methyl ester, ethyl ester), and these specific examples include a monocarboxylic acid and dicarboxylic acid, such as acrylic acid, methacrylic acid, crotonic acid and itaconic acid. The amount of the unsaturated carboxylic acid to be used is in the proportion of at most 10 weight % against the saponified product, preferably in the range of about 0.2 to 5 weight %. The term "radical-forming substance" means materials which can decompose readily into free radicals at temperatures of which graft polymerization proceeds, and their examples include organic peroxides, such as benzoyl peroxide, lauroyl peroxide and dicumyl peroxide, and nitrogen-containing compounds, such as $\alpha,\alpha'$-azobisisobutyronitrile. These radical-forming substances are used at the rate of about 0.05 to 3 weight % against the said saponified product, preferably about 0.1 to 1 weight %. The heating temperature may be varied depending upon the type of used unsaturated carboxylic cid or solvent, etc., and ranges from about 50° to 150° C., and the heting time is about 0.1 to 5 hours. The reaction with an acid anhydride is carried out by adding an acid anhydride to the heat-treated reaction solution and heating the mixture at about 50° to 150° C. for about 0.1 to 5 hours. The acid anhydride as used herein denotes compounds represented by the general formula

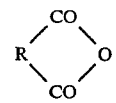

where R is a divalent aromatic or aliphatic residue, and their specific examples include a dicarboxylic acid anhydride, such as maleic anhydride, succinic anhydride, glutaric anhydride, phthalic anhydride, nadic anhydride and itaconic anhydride; and trimellitic anhydride. In the above reaction, the acid anhydride is assumed to undergo ring-opening with OH groups in the saponified product to form

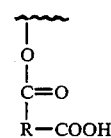

The amount of the acid anhydride is in such quantities as may be required to react (esterify) not less than at least 2 mole %, preferably about 5 to 50 mole %, out of the vinyl alcohol units in the saponified product.

The reaction solution resulting from the acid-modification reaction is then subjected to the treatment of contacting with water. As the method of contacting with water, there may be mentioned, for example, a procedure of pouring water into the reaction solution or a procedure of pouring the reaction solution into water. In any of these procedures, it is preferable to contact the reaction solution adequately with water mixing under vigorous stirring. Alternatively, there may be adopted a method of contacting them countercurrently in a column. The amount of water is not particularly limited, but there is normally used about 200 to 1000 (preferably 300 to 600) parts by weight of water against 100 parts by weight of the solid in the reaction solution. With reference to the contacting temperature, the room temperature suffices for the contacting, but the contacting is normally effected under the heated conditions (at 80° to 120° C.).

The reaction solution thus contacted with water is subjected to the treatment of heating to distill off the solvent to a certain degree (to distill off the solvent together with water in cases where the solvent is azeotropic with water). The distillation gives the concentrated reaction solution which is in the state of an emulsion. The distillation can be carried out by adjusting the amount of a solvent from 10 to 100 (preferably 20 to 80) parts by weight against 100 parts by weight of the solid in the concentrated solution. Alternatively, there may be adopted a method which comprises distilling off the solvent from the reaction solution, contacting the residue with water and emulsifying the mixture. When the emulsion is cooled to a temperature lower than a melting point of the carboxyl-modified resin (about 50° to 100° C.) while stirring vigorously, the carboxyl-modified resin separates out in the granular form. The carboxyl-modified resin which separates out in the granular form can be collected with use of the known separating means, such as filtration and centrifugation, followed by drying by use of the known drying means, such as vacuum drying and fluidized drying.

According to the above procedures, there can be obtained a carboxyl-modified resin of a saponified ethylene-vinyl acetate copolymer, the 1.0 mm-thick sheet from the carboxyl-modified resin having a total transmittance of more than 90%, a haze of less than 3% and a yellowness index of less than 3. The C-HEVA obtained usually has an acid value of 0.1 to 100, preferably 0.5 to 50 mgKOH/g. The preferred carboxyl-modified resin has a total transmittance of more than 90%, a haze of less than 2% and a yellowness index of less than 2 in the form of 1.0 mm-thick sheet. The percent values of a total transmittance and a haze are both measured in accordance with ASTMD 1003-61 (Standard Method of Test for Haze and Luminous Transmittance of Transparent Plastics) and the value of a yellowness index is calculated in accordance with ASTM D 1925-70 (Standard Method of Test for Yellowness Index of Plastics). The 1.0 mm-thick sheet is prepared by pressing the carboxyl-modified resin under the condition of 130° C. × 100 kg/cm$^2$ × 5 minutes using a pressing machine and a spacer having a thickness of 1 mm.

The carboxyl-modified resin of the present invention is colorless and excellent in transparency and is therefore of particular value as an interlayer of laminated glass and as a sealing material of a semiconductor element for a solar cell module and is utilized as an adhesive for transparent substrates, such as polycarbonate resins, polymethyl methacrylate or glass sheets.

In employing the C-HEVA as the interlayer for laminated glass, the C-HEVA is formed into a film by the conventionally used methods, such as a calender roll, extrusion sheet casting or inflation tube method. The thickness of the film is not specified, but normally is 50 to 800 μ. Uneven patterns can be provided on one side or both sides of the film by the known methods, such as an emboss roll method. The C-HEVA can be powdered by the known means, such as freeze-pulverizing, followed by heating and sintering the powder to form into a film. Furthermore, it is possible in the film forming step to add a ultraviolet absorber for the purpose of improving the light resistance and also a specific coloring material for the purpose of realizing the selective light transmittance to such an extent as may not impair the performance of laminated glass.

Using the intermediate film which is prepared from the C-HEVA, the manufacture of laminated glass by the reduced-pressure or vacuum process can be carried out in the following manner.

In the first place, one or plural intermediate films are inserted between two of a plurality of glass plates, respectively, to form a sandwich assembly. It is also possible to place between two intermediate films, for example, a sheet of printed plastic, paper or wood bark for the purpose of decoration, etc. or a film provided with such function as polarization for the purpose of imparting the functionality to laminated glass. An arbitrary pattern may also be formed on the intermediate film by the use of ink.

Subsequently, the sandwich assembly is heated while applying under imposing atmospheric pressure thereon by a vacuum drawn through evacuation. In order to apply atmospheric pressure on the assembly by a vaccum drawn through evacuation, a vacuum bag and a vacuum frame are usable. The vacuum bag may be formed by placing the sandwich assembly in a rubber or plastic bag being provided with a exhaust port and then exhausting the air in the bag by a vacuum pump. The application of atmospheric pressure by a vacuum may be maintained by placing the sandwich assembly in a vacuum frame made of wood or metal and covering it with a film made of plastics such as Tetron and polyvinyl alcohol or with a sheet made of rubber such as silicone rubber and neoprene rubber. In such a case, it is considered preferable from the standpoint of improved defoaming of the intermediate film to place a convex and concave surfaced sheet (the concave surface is continuous) made, for example, of silicone rubber and neoprene rubber between the sandwich assembly and the bottom of the vacuum frame. It is desirable in that the running of the intermediate film from around the sandwich assembly is prevented and that strain to be produced on the finished laminated glass is relieved to place around the sandwich assembly a bar made of metal or wood being higher by several millimeters than the height of the sandwich assembly, thereby keep atmospheric pressure from being applied to around the sandwich assembly.

Then, the vacuum bag or the vacuum frame obtained by the above manner is placed in a heating furnace and heated at the fixed temperature for the given period of time. The source of heating can be freely selected from the normally conceivable heating processes such as hot-oil, hot-water, hot-air, infrared ray, ultra-far infrared ray and high-frequency. The heating temperature is normally about 80° to 130° C. The degree of vacuum is normally less than 100 Torr, preferably less than 30 Torr.

After the given length of time elapses, operation of the vacuum pump is stopped, and vacuum in the vacuum bag or in the vacuum frame is vented to atmospheric pressure. It is preferred to hold the assembly in the heating furnace for a period of time in the neighborhood of 5 minutes, but not to take it out of the heating furnace immediately. This constitutes the so-called annealing procedure to eliminate the strain to be produced around the glass during bonding of laminated glass.

By the above procedure, laminated glass can be obtained. The thickness of the interlayer is normally 100 to 800 μ, but varies depending upon the practical use.

In employing the C-HEVA as a sealing material, the C-HEVA is normally used in the form of a sheet, and the sheet forming can be conducted by the customarily employed methods using a T-die extruder, etc. Thus, the C-HEVA is extruded into a sheet at such a temperature as may not invite substantial decomposition. The sheet preferably passes through a take-off roll provided with an emboss pattern. The formation of arbitrary emboss pattern is effective for the prevention of blocking as well as for the deaeration in the process during which the solar cell module is fabricated.

The thickness of the sheet is not particularly specified, but is generally in the range of about 0.1 to 1 mm.

In cases in which more stringent light stability is required, it is preferred to add a light stabilizer to the C-HEVA, and as a stabilizer, there are used, to such an extent as may not damage the transparency of a sealing material, benzophenones, such as 2-hydroxy-4-methoxybenzophenone, 2,2'-dihydroxy-4-methoxybenzophenone, 2-hydroxy-4-methoxy-2'-carboxybenzophenone and 2-hydroxy-4-n-octoxybenzophenone; benzotriazoles, such as 2-(2'-hydroxy-3,3-di-tert-butylphenyl)-benzotriazole, 2-(2'-hydroxy-5-methylphenyl)benzotriazole and 2-(2'-hydroxy-5-tert-octylphenyl)benzotriazole, salicylates, such as phenyl salicylate and p-octylphenyl salicylate, nickel complex salts, hindered amines, etc. These light stabilizers are also used in combination with antioxidants such as hindered phenols and phosphites, whereby the synergistic effect in some instances can be expected.

Furthermore, other resins and inorganic fillers may be added to the C-HEVA to such an extent as may not damage the performance of a solar cell module.

The fabrication of a solar cell module is carried out in the following manner. A semiconductor element for the solar cell, which consists of a silicon or selenium semiconductor wafer, is sandwiched between at least two sealing material sheets, further placing on both sides of the sandwiched assembly the protective materials, or the transparent protective material for the top and the protective material for the bottom substrate, and bonding them together by heating under reduced pressure. On the occasion of this, the solar cell element may be laminated with at least two sealing material sheets, followed by bonding the laminated assembly to the transparent protective material for the top and protective material for the bottom substrate. The heating is desirably carried out at a temperature between 90° and 110° C. Such a heating treatment ensures firm bonding of the sealing material to each of the protective materials, whereby there is fabricated a solar cell module having the solar cell element laminated with two sealing material sheets, the laminated assembly being firmly bonded to the transparent protective material for the top and protective material for the bottom substrate.

In cases in which the semiconductor element for the solar cell is formed on the protective material, such as glass, plastics, ceramics and stainless steel, the sealing material sheet is employed as the intermediate layer and the sheet is inserted between the transparent protective material for the top and protective material for the bottom substrate, either of which has the semiconductor element formed on the inner surface (the surface in contact with the sealing material sheet). More specifically, the sealing material sheet and the transparent protective material for the top are successively put on the semiconductor element formed on the top surface of the protective material for the bottom substrate, or the sealing material sheet and the protective material for the bottom substrate are successively placed beneath the semiconductor element formed on the under surface of the transparent protective material for the top, followed by bonding them together by heating under reduced pressure in the same manner as described above. By the above-mentioned procedure, there is fabricated a solar cell module of one protective material with the semiconductor element, the sealing material sheet and the other protective material being firmly bonded together.

The solar cell module fabricated by bonding in the above manners exhibits good initial and durable adhesion properties, for example, increased peeling strength developed between the protective materials and the sealing material and improved peeling resistance under high humidity conditions, and shows lessened change when exposed to ultraviolet irradiation, retaining excellent light transmittance. From this, it can be said that various physical properties required of a solar cell module are sufficiently satisfied.

Described in the following are the examples to illustrate the present invention more specifically.

EXAMPLE 1

In a 20-l stainless-steel reaction vessel fitted with a stirrer, condenser, thermometer and pipe for introducing a nitrogen gas were placed 5 l of industrial xylene and 2 kg of an EVA with a melt index (g/10 min.; by ASTM D 1238-65 T.) of 30 and a viny acetate content of 33 weight %, as prepared by the high pressure polymerization process. The mixture was heated until the inner temperature reached to 50° C., thereby a uniform solution was obtained. 194 g of methanol and 69 g of 24% sodium methoxide-methanol solution as prepared in advance, together with 7.2 g of water, were added to the solution. After the reaction was allowed to proceed at 45° to 55° C. for 60 minutes under stirring, 27 g of water was added to the reaction mixture in order to terminate completely the saponification reaction. The resulting saponified product exhibited a degree of saponification of about 50%. Subsequently, the inner temperature was raised up to 120° C. under a nitrogen gas stream, while distilling off the low-boiling substances. 20 g of acrylic acid and 2 g of benzoyl peroxide were added to the reaction mixture, and the graft reaction was carried out at 120° C. for 30 minutes with stirring to modify the saponified product with the acid. Successively, this viscous reaction mixture was transferred, under applied pressure with a nitrogen gas, into a 20-l Henschel mixer fitted with a condenser, pipe for introducing a nitrogen gas and thermometer. After the inner temperature was decreased down to 100° C., 12 l of warm water at 80° C. was added thereto. This mixture was heated under stirring at a number of revolutions of 510 r.p.m. to distill off xylene through azeotropy with water until the amount of the xylene remaining in the system reached 60 parts by weight against 100 parts by weight of the solid. At the time when the distillation of xylene was finished, the system has become an emulsion.

The emulsion was cooled under stirring at 510 r.p.m., while introducing cold water into a jacket of the Henschel mixer, to give a granular material of an average particle size of 2 mm. The material was centrifuged and then dried under vacuum at 50° C. for 4 hours to yield 1835 g of the carboxyl-modified resin having the physical properties as shown in Table-I.

REFERENCE EXAMPLE I

In a 20-l stainless steel reaction vessel as employed in Example I were charged 7 l of industrial xylene and 2 kg of an EVA with a melt index of 30 and a vinyl acetate content of 33 weight % as prepared in accordance with the high-pressure polymerization process, and heating was effected until the inner temperature reached 45° C., thereby a uniform solution was obtained. 85 g of methanol and 69 g of 24% sodium methoxide-methanol solution as prepared in advance were added to the solution. After the reaction was allowed to proceed at 43° to 48° C. for 60 minutes under stirring, 35 g of water was added to terminate completely the saponification reaction. The resulting saponified product exhibited a degree of saponification of about 50%. The solution was subjected to a graft reaction in the same manner as in Example I to modify the saponified product with an acid, the reaction mixture was transferred into a 20-l Henschel mixer, followed by treatment in the same manner as in Example I to yield 1830 g of a carboxyl-modified resin having the physical properties as shown in Table-I.

REFERENCE EXAMPLE II

After the saponification and graft reactions were carried out in the same manner as in Example I, the reaction solution was transferred into a 20-l Henschel mixer, and 6 l of industrial methanol was added gradually to the solution with stirring at 510 r.p.m. to give a powdered product of an average particle size of 300 μ. The product was centrifuged, transferred again into a 20-l Henschel mixer and washed with 6 l of methanol added for 30 minutes with stirring. The precipitate was centrifuged and then dried under vacuum to give 1750 g of a carboxyl-modified resin having the physical properties as shown in Table-I.

REFERENCE EXAMPLE III

After the saponification and graft reactions were carried out in the same manner as in Reference Example I, the reaction solution was transferred into a 20-l Henschel mixer, followed by treatment in the same manner as in Reference Example II to give 1730 g of a carboxyl-modified resin having the physical properties as shown in Table-I.

TABLE I

| | Example | Reference Example | | |
|---|---|---|---|---|
| | I | I | II | III |
| Vinyl alcohol content (mole %) | 7.0 | 6.9 | 6.9 | 6.8 |
| Acrylic acid content (wt %) | 0.3 | 0.3 | 0.3 | 0.3 |
| Sodium acetate content (wt %) | 0.1 | 0.1 | 0.1 | 0.1 |
| Melt index (g/10 min.) | 20 | 20 | 17 | 17 |
| Degree of coloration | Not colored at all | Deep yellow-brown colored | Not colored at all | Yellow colored |

EXAMPLE II

In a 20-l stainless steel reaction vessel fitted with a stirrer, condenser, thermometer and pipe for introducing a nitrogen gas were charged 5 l of industrial xylene and 2 kg of an EVA with a melt index of 30 and a vinyl acetate content of 33 weight % as prepared by the high pressure polymerization process, and heating was effected until the inner temperature reached to 50° C., thereby a uniform solution was obtained. 904 g of methanol and 103 g of 24% sodium methoxide-methanol solution as prepared in advance, together with 6.6 g of water, were added to the solution. After the reaction was allowed to proceed at 45° to 55° C. for 60 minutes, 40 g of water was added to the reaction mixture in order to terminate completely the saponification reaction. The saponified product thus obtained exhibited a degree of saponification of about 70%. Subsequently, the inner temperature was raised up to 125° C. under a nitrogen gas stream, while distilling off the low-boiling substances and water. After 1 kg of the industrial xylene was distilled off at the above temperature, supply of a nitrogen gas was stopped, and cooling was effected until the inner temperature reached 100° C. 106 g of hexahydrophthalic anhydride was added in the reaction vessel, and the reaction was carried out at 100° to 105° C. for 60 minutes under stirring. The reaction solution was transferred, under applied pressure with a nitrogen gas, into a 20-l Henschel mixer fitted with a condenser, pipe for introducing a nitrogen gas and thermometer, and 12 l of warm water heated at 80° C. was added thereto. The mixture was heated under stirring at a number of revolutions of 510 r.p.m. to distill off xylene through azeotropy with water until the amount of the xylene remaining in the system reached 70 parts by weight agaist 100 parts by weight of the solid. At the time when the distillation of xylene was finished, the system has become an emulsion. The emulsion was cooled under stirring at 510 r.p.m., while introducing cold water into a jacket of the Henschel mixer, to give a granular material of an average particle size of 2 mm. The material was centrifuged and then dried under vacuum at 50° C. for 4 hours to yield 1920 g of a carboxyl-modified resin having the following physical properties:

| | |
|---|---|
| Vinyl alcohol content | 7.7 mole % |
| Acid content | 1.9 mole % |
| Sodium acetate content | 0.1 wt. % |
| Melt index (g/10 min.) | 15 |
| Degree of coloration | Not colored at all |

EXAMPLE III

In a 20-l stainless-steel reaction vessel fitted with a stirrer, condenser, thermometer and pipe for introducing a nitrogen gas were placed 6 l of industrial xylene and 2 kg of an EVA with a melt index of 30 and a vinyl acetate content of 33 weight %, as prepared by the high pressure polymerization process. The mixture was heated until the inner temperature reached to 50° C., thereby a uniform solution was obtained. 905 g of methanol and 102 g of 24% sodium methoxide-methanol solution as prepared in advance, together with 6.6 g of water, were added to the solution. After the reaction was allowed to proceed at 45° to 55° C. for 60 minutes under stirring, 31 g of water was added to the reaction mixture in order to terminate completely the saponification reaction. The resulting saponified product exhibited a degree of saponification of about 70%. Subsequently, the inner temperature was raised up to 120° C. under a nitrogen gas stream, while distilling off the low-boiling substances. 26 g of acrylic acid and 2 g of benzoyl peroxide were added to the reaction mixture, and the graft reaction was carried out at 120° C. for 30 minutes with stirring to modify the saponified product with the acid.

Using the same procedures as in Example I, there was obtained 1770 g of a carboxyl-modified resin having the physical properties as shown below.

| | |
|---|---|
| Vinyl alcohol content | 9.6 mole % |
| Acrylic acid content | 0.5 wt. % |
| Sodium acetate content | 0.1 wt. % |
| Melt index (g/10 min.) | 18 |
| Degree of coloration | Not colored at all |

Experiment

Using each of the carboxyl-modified resins obtained in the Working Examples I to III and the Reference Examples I to III, a 1.0 mm-thick sheet was prepared under the condition of 130°C.×100 kg/cm²×5 minutes by means of a heat pressing machine. The measured values of a total transmittance, a haze and a yellowness index were shown in the following Table-II.

TABLE II

| | Example No. | | | | | |
|---|---|---|---|---|---|---|
| | Example | | | Reference Example | | |
| Properties | I | II | III | I | II | III |
| Total Transmittance*[1] (%) | 92.4 | 92.5 | 92.3 | 91.4 | 89.3 | 89.0 |
| Haze*[1] (%) | 1.8 | 1.6 | 1.9 | 2.0 | 6.8 | 7.1 |
| Yellowness Index*[2] | 1.6 | 1.8 | 1.6 | 12.2 | 1.5 | 6.1 |

*[1]Digital Haze Meter NDH-20D Type by Nippon Denshoku Kogyo Co., Ltd. Measured in accordance with ASTM D1003-61 (JIS K 6714)
*[2]Automatic Digital Color Difference Measuring Meter by Suga Test Instrument Co., Ltd. The values of L, a, b were measured in accordance with ASTM D 2244-68 (JIS Z 8730) and Yellowness Index (YI) was calculated in accordance with ASTM D 1925-70 (JIS K 7103).

EXAMPLE IV

Using a T-die extrusion method, six kinds of the carboxyl-modified resins as obtained in Examples I to III and Reference Examples I to III were extruded into the films of 380 μ in thickness, which were then passed through embossing roll to prepare the films with an apparent thickness of 440 μ having a continuous uneven pattern on one side. The films were cut to a piece of 62 cm square, respectively. The pieces were inserted respectively between two float glass plates 3 mm thick and 24 inch square to make the sandwich assemblies. A sheet of neoprene rubber of 3 mm in thickness being provided with an embossed pattern was laid on a vacuum frame stand made of stainless steel, and each of said sandwich assemblies was placed thereon. The said sandwich assembly was enclosed, 10 mm apart from each side of the assembly, with four wood bars 10 mm high and 10 mm wide, and covered with a polyethylene terephthalate film of 50 μ in thickness to form a vacuum frame.

The vacuum frame, while being evacuated by a vacuum pump so that the pressure inside the frame might be not more than 10 mmHg, was inserted into a ultra-far infrared heating furnace set at 100° C. After 20 minutes elapsed, the vacuum pump was turned off, and the vacuum inside the vacuum frame was vented to atmospheric pressure, followed by heating for another 5 minutes. The assembly was taken out and cooled gradually at room temperature. Each of the said sandwich assemblies had no remaining air bubble and exhibited a bonded thickness of about 0.38 mm. The appearance of the laminated glasses thus manufactured was assessed, and the results are shown in Table-III.

TABLE III

| | Example No. | | | | | |
|---|---|---|---|---|---|---|
| | Example | | | Reference Example | | |
| Properties | I | II | III | I | II | III |
| Total transmittance* (%) | 88 | 88 | 88 | 72 | 80 | 78 |
| Haze* (%) | 0.6 | 0.7 | 0.9 | 1.8 | 4.8 | 5.1 |
| Degree of coloration | Not colored at all | Not colored at all | Not colored at all | Deep yellow colored | Not colored at all | Yellowish colored |

*Measured by Digital Haze Meter, Type NDH-20D, manufactured by Nippon Denshoku Kogyo Co., Ltd.

EXAMPLE V 0.5 part by weight of Tinuvin ® 326 (product by Ciba-Geigy Co.) was melt-blended into 100 parts by weight of the carboxyl-modified resin as prepared in Example I. The blended material was formed into pellets. The pellets are extruded into a sheet at the resin temperature of 100° C. using a T-die extruder, and a 0.4 mm-thick sheet of an C-HEVA was prepared, while providing on its both surfaces with an embossed pattern through a take-off roll engraved with an embossed pattern.

The sheet thus obtained was sandwiched in between a pair of circular, curved glass panes with a thickness of 3 mm and a diameter of 30 cm made of float glass. The sandwich was placed into a bag made of a CPP/6-nylon laminate and the opening of the bag was heat-sealed, followed by evacuation at room temperature through the evacuation port by a KD-300 type vacuum pump manufactured by Shimadzu Seisakusho, Ltd. of Japan. While applying the vacuum, the vacuum bag was immersed in warm water at 60° C. for 3 minutes, and then in boiling water for 15 minutes to conduct heating. The bag was taken out of the boiling water and cooled by immersing it in warm water at 50° C. for 3 minutes. After the vacuum pump turned off, the vacuum bag was opened to take out the curved glass pane. In this manner, there was obtained colorless, transparent and bubble-free curved, laminated glass having about 0.4 mm of a thickness of the bonding layer.

The curved laminated glass was subjected to a heat resistance test which consisted of immersing it in warm water at 65° C. for 3 minutes and successively holding it nearly perpendicular in boiling water for 2 hours, whereby there was not observed any damage to the laminated glass, such as turbidity and peeling.

EXAMPLE VI 0.5 part by weight of Tinuvin ® 326 (product by Ciba-Ceigy Co.) was melt-blended into 100 parts by weight of the C-HEVA as prepared in Example II. The blended material was extruded into pellets. A 0.4 mm-thick sheet provided on its both surfaces with an embossed pattern was fabricated in the same manner as in Example V using an extruder.

Using the embossed sheet, curved laminated glass was manufactured by the same procedure as in Example V. Colorless, transparent and bubble-free laminated glass was obtained.

A heat resistance test in the same manner as in Example V resulted in that there was observed no damage to the laminated glass.

EXAMPLE VII 0.5 part of Tinuvin ® 326 (product by Ciba-Geigy Co.) was melt-blended into 100 parts by weight of the resin as prepared in Example I. The blended material was formed into pellets. The pellets were extruded into a sheet at the resin temperature of 95° C. using a T-die extruder. The sheet was provided on its both surfaces with an emboss pattern by means of a take-off roll engraved with the emboss pattern to give a 0.5 mm-thick embossed sheet.

A plural number of silicon semiconductor wafers arranged in series with the help of interconnectors were placed between two embossed sheets to make a sandwiched assembly. A transparent flat glass plate and a polyvinyl fluoride sheet were placed thereon and thereunder, respectively, followed by conducting melt-bonding through heating at a heating temperature of 100° C. for 10 minutes to bond firmly the assembly together with both protective materials, thereby a solar cell module was obtained.

Using the module thus obtained, a temperature-humidity cycle test was conducted. The test (one cycle: 4 hours at a temperature of 23° C. and a relative humidity of 50%, followed by 10 hours at a temperature of 40° C. and a relative humidity of 90%) on a temperature-humidity cycle test machine manufactured by Kusumoto Kasei Co. of Japan was carried out in 40 cycles. Visual inspection was made for a change in surface appearance in term of peeling.

The above-mentioned embossed sheet was overlaid on a flat glass plate and polyvinyl fluoride sheet, respectively, and flat glass plate-embossed sheet and polyvinyl fluoride sheet-embossed sheet laminates were produced under the above bonding conditions. Peeling strengths of these laminates were measured with five test specimens in a T-type peeling at a pulling rate of 200 mm/min and at 23° C. with use of a tensile testing machine. The mean values of measurements were taken as a measure of assessing the adhesion property.

The solar cell module as fabricated above was subjected to an accelerated weathering test under the conditions of a black panel temperature of 62° C. and a 2-hour cycle by use of a sunshine weather-O-meter manufactured by Toyo Rika Kogyo Co. of Japan. Visual inspection was conducted for a change in surface appearance after 500-hours, 1000-hours and 2000-hours exposures.

EXAMPLE VIII 0.5 part by weight of Tinuvin ® 326 (product by Ciba Geigy Co.) was melt-blended into 100 parts by weight of the resin as prepared in Example II. The blended material was extruded into pellets. Using an extruder, the pellets were extruded to form a 800 µ-thick sheet provided on its both surfaces with an embossed pattern similar to the sheet in Example VII.

With use of this embossed sheet, a solar cell module and various laminates were fabricated by a procedure similar to the procedure in Example VII. The performance test similar to the performance test in Example VII was carried out.

The results of the tests are tabulated in Table-IV.

TABLE IV

| | Solar cell module | | Peeling bonding strength (kg/cm) | |
|---|---|---|---|---|
| | Temperature-humidity cycle test | W-O-M test | Flat glass plate side | Polyvinyl fluoride sheet side |
| Example VII | 40 cycles: No change in surface appearance | 2000 hrs.: No change in surface appearance | 5.0 | 3.0 |
| Example VIII | 40 cycles: No change in surface appearance | 2000 hrs.: No change in surface appearance | 4.5 | 2.5 |

What is claimed is:

1. A carboxyl-modified resin of a saponified ethylene-vinyl acetate copolymer, a 1.0 mm-thick sheet therefrom having a total transmittance of more than 90%, a haze of less than 3% and a yellowness index of less than 3.

2. A carboxyl-modified resin according to claim 1, the carboxyl-modified resin having an acid value of 0.1 to 100 mgKOH/g.

3. A carboxyl-modified resin according to claim 1, wherein the base polymer for the saponified copolymer is an ethylene-vinyl acetate copolymer with a vinyl acetate content of 20 to 50 weight % and a melt index of 0.5 to 500 g/10 min.

4. A carboxyl-modified resin according to claim 1, wherein the saponification degree of the saponified copolymer is about 10 to 80%.

5. A carboxyl-modified resin according to claim 1, the carboxyl-modified resin being a modification of the saponified ethylene-vinyl acetate copolymer with an unsaturated carboxylic acid or acid anhydride.

6. A carboxyl-modified resin according to claim 5, wherein the unsaturated carboxylic acid is acrylic acid.

7. A carboxyl-modified resin according to claim 1, the carboxyl-modified resin having a total transmittance of more than 90%, a haze of less than 2% and a yellowness index of less than 2 in the form of its 1.0 mm-thick sheet.

8. A process for producing a carboxyl-modified resin of a saponified ethylene-vinyl acetate copolymer, a 1.0 mm-thick sheet from the carboxyl-modified resin having a total transmittance of more than 90%, a haze of less than 3% and a yellowness index of less than 3, which comprises dissolving an ethylene-vinyl acetate copolymer with a vinyl acetate content of about 20 to 50 weight % in an aromatic hydrocarbon having a boiling point of not less than than 50° C., said aromatic hydrocarbon being present in an amount of 150 to 500 parts by weight per 100 parts by weight of the ethylene-vinyl acetate copolymer, saponifying the copolymer with an alkali alcoholate in the solution in the presence of water of 0.1 to 3 moles per mole of the alcoholate, and allowing the saponified product in the reaction solution to react with an unsaturated carboxylic acid or acid anhydride and contacting the said reaction solution with water.

9. A process for producing a carboxyl-modified resin according to claim 8, wherein the saponification is carried out in the presence of a lower alcohol.

10. A process for producing a caboxyl-modified resin according to claim 9, wherein the lower alcohol is methanol.

11. A process for producing a carboxyl-modified resin according to claim 9, wherein the lower alcohol is used in the proportion of about 0.1 to 10 moles per mole of vinyl acetate in the ethylene-vinyl acetate.

12. A process for producing a carboxyl-modified resin according to claim 8, wherein the amount of the alkali alcoholate catalyst to be used in the saponification reaction is at the rate of about 0.01 to 1 mole per mol of vinyl acetate in the starting ethylene-vinyl acetate copolymer.

13. A process for producing a carboxyl-modified resin according to claim 8, wherein the saponification reaction is carried out at 40° to 60° C.

14. A process for producing a carboxyl-modified resin according to claim 8, the saponification reaction is terminated by adding water to the reaction system.

15. A process for producing a carboxyl-modified resin according to claim 8, wherein the modification reaction of the saponified copolymer in the solution with an unsaturated carboxylic acid or acid anhydride is carried out at about 50° to 150° C.

16. A process for producing a carboxyl-modified resin according to claim 8, wherein the modification reaction of the saponified copolymer in the solution with an unsaturated carboxylic acid is carried out in the presence of a radical-forming substance.

17. A process for producing a carboxyl-modified resin according to claim 16, wherein prior to the modification reaction, the saponification reaction solution is heated to remove the water used for the saponification reaction and the termination of the reaction and low-boiling by-products formed by the saponification reaction.

18. A process for producing a carboxyl-modified resin according to claim 8, wherein the contacting of the reaction solution resulting from the acid-modification reaction, with water is carried out by a procedure of pouring water into the reaction solution or a procedure of pouring the reaction solution into water.

19. A process for producing a carboxyl-modified resin according to claim 18, wherein the contacting is carried out mixing under vigorous stirring.

20. A process for producing a carboxyl-modified resin according to claim 18, wherein the amount of water for contacting with the reaction solution is 200 to 1000 parts by weight of water against 100 parts by weight of the solid in the reaction solution 21. A process for producing a carboxyl-modified resin according to claim 18, wherein the contacting is effected under the heated condition.

22. A process for producing a carboxyl-modified resin according to claim 18, wherein the reaction solution contacted with water is subjected to the treatment of heating to distill off the solvent to a certain degree.

23. A process for producing a carboxyl-modified resin according to claim 22, wherein the distillation is carried out in the state of an emulsion.

24. A process for producing a carboxyl-modified resin according to claim 23, wherein the distillation is carried out by adjusting the amount of a solvent of 10 to 100 parts by weight against 100 parts by weight of the solid in the concentrated solution.

25. A process for producing a carboxyl-modified resin according to claim 23, wherein the emulsion is cooled to a temperature lower than a melting point of the carboxyl-modified resin, the carboxyl-modified resin separating out in the granular form.

26. A carboxyl-modified resin of a saponified ethylene-vinyl acetate copolymer, a 1.0 mm-thick sheet therefrom having a total transmittance of more than 90%, a haze of less than 3% and a yellowness index of less than 3, said resin being produced by dissolving an ethylene-vinyl acetate copolymer with a vinyl acetate content of about 20 to 50 weight % in an aromatic hydrocarbon having a boiling point of not less than 50° C., said aromatic hydrocarbon being present in an amount of 150 to 500 parts by weight per 100 parts by weight of the ethylene-vinyl acetate copolymer, saponifying the copolymer with an alkali alcoholate in the solution in the presence of water of 0.1 to 3 moles per mole of the alcoholate, and allowing the saponified product in the reaction solution to react with an unsaturated carboxylic acid or acid anhydride and contacting the said reaction solution with water.

* * * * *